Figure 1:
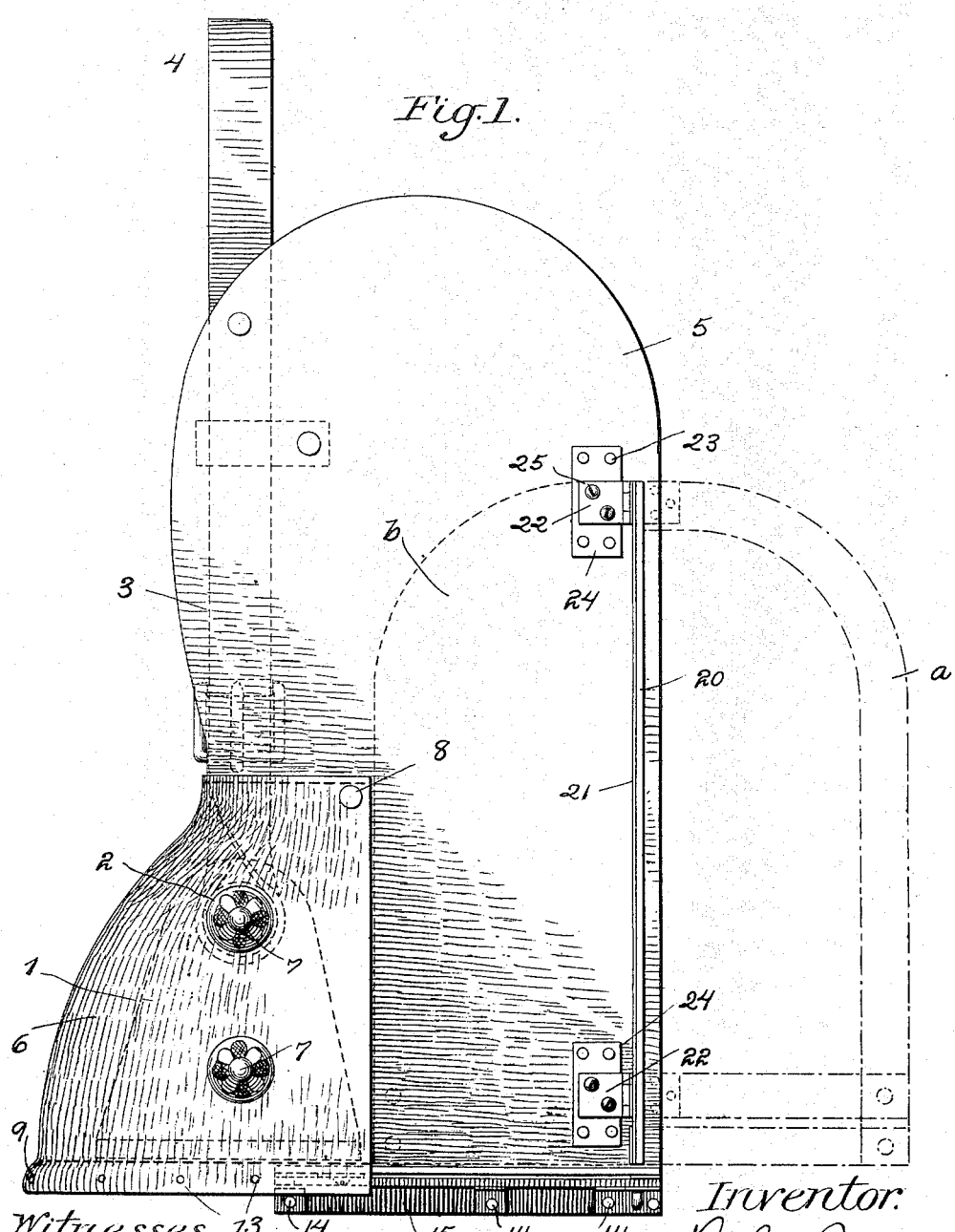

No. 642,292. Patented Jan. 30, 1900.
R. C. BROOKES.
FENDER FOR EQUESTRIAN STIRRUPS.
(Application filed Oct. 6, 1898.)

(No Model.) 2 Sheets—Sheet 1.

Witnesses:
Inventor:
R. C. Brookes,
By his attorneys

No. 642,292. Patented Jan. 30, 1900.
R. C. BROOKES.
FENDER FOR EQUESTRIAN STIRRUPS.
(Application filed Oct. 6, 1898.)
(No Model.) 2 Sheets—Sheet 2.
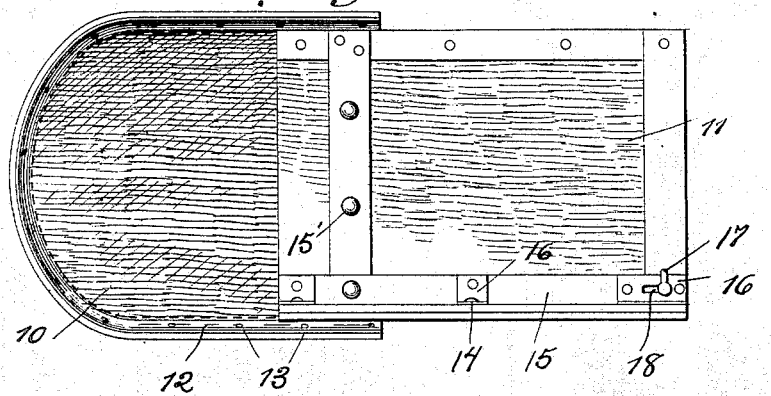
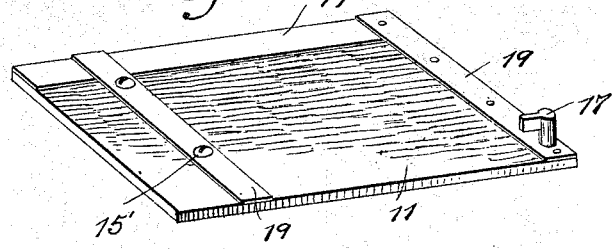
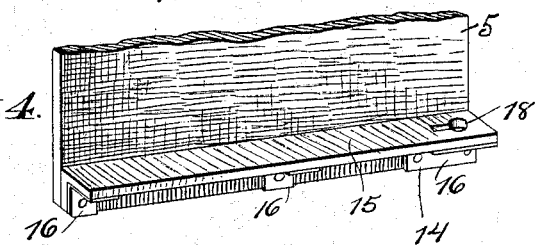
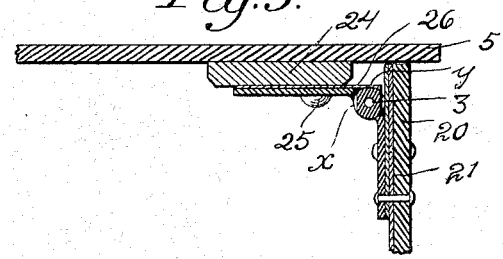
Witnesses:
D. W. Edelin.
J. E. Hutchison Jr.
Inventor.
R. C. Brookes,
By his attorneys
Rennie & Goldsborough

UNITED STATES PATENT OFFICE.

ROBERT C. BROOKES, OF FOREST, MISSISSIPPI.

FENDER FOR EQUESTRIAN STIRRUPS.

SPECIFICATION forming part of Letters Patent No. 642,292, dated January 30, 1900.

Application filed October 6, 1898. Serial No. 692,810. (No model.)

*To all whom it may concern:*

Be it known that I, ROBERT C. BROOKES, a citizen of the United States, residing in Forest, in the county of Scott and State of Mississippi, have invented certain new and useful Improvements in Fenders for Equestrians; and I do hereby declare the following to be a full, clear, and exact description of the invention, such as will enable others skilled in the art to which it appertains to make and use the same.

My invention has for its object to provide saddle-stirrups with fenders or shields adapted to protect the feet and legs of equestrians from mud and water spattered by the horse or from rain or snow in inclement weather, and is designed more particularly as an improvement upon the device covered in my Patent No. 610,640, granted to me September 13, 1898.

The characteristic features of the invention will be fully described hereinafter and are illustrated in the accompanying drawings, in which—

Figure 1 is a side elevation of a stirrup with my improved fender attached thereto. Fig. 2 is a bottom plan view of the same. Fig. 3 is a perspective view of the bottom piece detached. Fig. 4 is a perspective view of a portion of the fender, and Fig. 5 is a horizontal sectional view of the hinge and its connection.

Referring to the drawings, the reference-numeral 1 designates the stirrup, comprising a cross-bar 2, to which the lower end of the usual stirrup-strap 3 is secured, the upper loop 4 of which is adapted to be secured to the saddle. (Not shown.)

5 indicates one section of the fender, consisting, preferably, of a single piece of sole-leather extending nearly the length of the stirrup-strap. It is secured at its lower front end to the stirrup 1 and at points near its upper end to the loop 4 and adapted to protect the inner side of the rider's leg from rubbing against the horse and from being spattered from beneath. It projects some distance to the rear of the stirrup, as shown in Fig. 1.

6 indicates a hood, preferably separate from the section 5 and covering the front and both sides of the stirrup. The hood is secured to the stirrup on the outside by rivets or other fastenings 7, and its inner side is suitably riveted or otherwise secured to the inner side of the section 5 and the stirrup. The upper edge of the hood on the outer side is secured by a row of stitches, and a rivet 8 passes through both sides of the hood and the section 5, securing it to the latter at the upper corner. The lower edge 9 of the hood is attached, preferably, by stitching all the way around to the edge of a bottom piece 10, which, together with the detachable piece 11, forms the base or bottom of the fender. The lower edge of the hood extends slightly below the stitches which secure it to this bottom piece, so as to drain off the water from the stitches, and I preferably also provide the inner side of the extended edge of the hood with a metal strip 12, secured thereto by rivets or other fastenings 13, which serves to keep the hood always in proper shape. This hood does not extend so far rearwardly as in my previously-patented fender, but leaves room enough for the rear fender to fold flat against the inner section.

To the lower edge of the fender-section 5 an angular strip 15, preferably of leather, is securely fastened by rivets 14 and sustained in position by angle-braces 16. This strip serves as a partial support for a detachable bottom piece or heel-rest 11, which is securely attached at its forward edge to the under side of the stirrup by screws or similar fastening devices 15', so that, if desired, the bottom piece, which extends rearwardly to the back edge of the section 5, may be easily detached. At one corner of this bottom piece 11 a turn-key 17 is provided, and this key is adapted to engage a corresponding keyhole 18 at the rear end of the angular strip 15 previously described, by which arrangement means is provided for detachably securing the rear end of the heel-rest to the fender. In order to retain the proper shape of this piece 11 when the same is wet and prevent warping, I provide metal strips 19, attached to the under side thereof and running along its outer edge and across the front and rear ends, as shown in Fig. 3.

20 indicates a hinged and folding section constituting a guard or shield for the rear of the leg. It is composed of a single piece of sole-leather, preferably braced by thin metal strips 21 extending along its edges. These strips 21 serve to retain the proper shape of the said section 20, and also serve to give the hinges 22, by means of which the section is secured to the section 5, a much more secure attachment than they otherwise would have. Securely attached to the section 5 near its upper and lower rear edges by rivets 23 are metal plates 24, by means of which the hinges 22 are secured to the fender-section 5. These hinges are attached to the plates 24 by screws in order to allow them to be easily detached from the section 5, if desired.

I have shown the rear section 20 in Fig. 1 in its different positions, the position shown in full lines being the one used while riding, and in which position it serves as a guard against the spattering of mud and water by the horse on the rear of the rider's leg. In the position indicated by the dotted lines $a$ in Fig. 1 the rear section is folded back in line with the section 5 and is the position the section assumes when the rider desires to dismount or when, as in riding among trees or undergrowth, it would be liable to injury, and when it is desired to pack the fender for shipment or when in dry weather it is not needed as a guard the rear section is turned forwardly to the position shown by the dotted lines $b$, where it lies flat against the section 5.

In order to hold this rear section in these several positions, I construct the hinges 22 as shown in Fig. 5. Each hinge is made up, as usual, of two sections or leaves, and the knuckle of one leaf is provided with three flat surfaces $x\ y\ z$, with which engages a spring 26, which is held by screws 25 rigid with the other leaf, being secured between said other leaf of the hinge and the metal plate 24.

The object of securing the heel-rest and the rear fender-section to the stirrup and the inner section detachably is to enable these parts to be removed entirely and the devices used with the inner section and the hood only, and the object of hinging the rear section so as to fold forwardly and backwardly is to enable the whole fender to be folded in small space for storage or transportation, as well as to permit the folding back of the section either to enable the rider to dismount without interfering with it or to provide an extension of the inner section when in use. It also prevents the horse from injuring the fender by rubbing against trees, posts, &c., by readily folding in either direction. The extension of the lower edge of the hood below the bottom piece serves to keep the dripping water from settling in the line of stitches, and the bracing-strip 12 serves to keep this edge in proper shape and strengthens the joint or fastening between the rear edge of the hood and the lower end of the inner section.

Having thus described my invention, what I claim is—

1. The combination with a saddle-stirrup, of a fender comprising an inner section secured to the stirrup and extending upwardly along the rider's leg, and having an angular strip 15 attached to its lower edge, a bottom piece 11 detachably fastened to the under side of the stirrup at its front edge and to said angular strip along its inner edge, and means for detachably fastening the bottom piece to the strip.

2. The combination with a saddle-stirrup, of a fender comprising an inner section secured to the stirrup and extending upwardly along the rider's leg, a hood covering the front and sides of the stirrup, and a flat rear section hinged to the inner section near its rear edge and adapted to fold forwardly against the outer face of the inner section in rear of the stirrup and hood and means for holding said rear section in folded position.

3. The combination with a saddle-stirrup, of a fender comprising an inner section secured to the stirrup, and a rear section hinged to the inner section near its rear edge to fold rearwardly in line with said section to form a rear extension of the same or at right angles to said section as desired, and means to hold said rear section in either of said positions.

4. The combination with a saddle-stirrup of a fender comprising an inner section secured to the stirrup and extending upwardly along the rider's leg, a bottom piece 11 detachably fastened to the under side of the stirrup and extending rearwardly therefrom, a detachable connection between said bottom piece and the lower end of the inner section, a bottom piece 10 secured at its rear edge to the stirrup and extending forwardly therefrom, a hood covering the front and sides of the stirrup and secured to the edges of the bottom piece 10.

In testimony whereof I affix my signature in presence of two witnesses.

ROBT. C. BROOKES.

Witnesses:
JEFF KENT,
W. L. JONES.